United States Patent
Nishizawa et al.

(10) Patent No.: US 7,403,959 B2
(45) Date of Patent: Jul. 22, 2008

(54) QUERY PROCESSING METHOD FOR STREAM DATA PROCESSING SYSTEMS

(75) Inventors: Itaru Nishizawa, Koganei (JP); Tsuneyuki Imaki, Tokyo (JP); Shinji Fujiwara, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 342 days.

(21) Appl. No.: 11/195,664

(22) Filed: Aug. 3, 2005

(65) Prior Publication Data
US 2006/0277230 A1 Dec. 7, 2006

(30) Foreign Application Priority Data
Jun. 3, 2005 (JP) ............................. 2005-163440

(51) Int. Cl.
*G06F 17/30* (2006.01)
(52) U.S. Cl. ..................................... 707/204
(58) Field of Classification Search ................ 707/2, 707/3, 4, 10, 204; 715/500.1; 709/224
See application file for complete search history.

(56) References Cited

U.S. PATENT DOCUMENTS

| | | | |
|---|---|---|---|
| 5,193,171 A * | 3/1993 | Shinmura et al. ............ | 711/113 |
| 5,495,600 A | 2/1996 | Terry et al. | |
| 6,239,793 B1 * | 5/2001 | Barnert et al. ............ | 715/500.1 |
| 2003/0135612 A1 * | 7/2003 | Huntington et al. ......... | 709/224 |
| 2006/0075258 A1 * | 4/2006 | Adamson et al. ............ | 713/189 |

OTHER PUBLICATIONS

"Query Processing, Resource Management, and Approximation in a Data Stream Management System" by Motwani, et al. Proceedings of the 2003 CIDR Conference.
"Maximizing the Output Rate of Multi-Way Join Queries over Streaming Information Sources" by Stratis D. Viglas, et al. Proceedings of the 29th VLDB Conference, Berlin, Germany, 2003.
"Principles of Database and Knowledge-Base Systems" vol. II., "Optimization for Conjunctive Queries", by Jeffrey D. Ullman, Chpt. 14, pp. 877-916., Computer Science Press.
"Rate-Based Query Optimization for Streaming Information Sources" by Viglas, et al. ACM SIGMOD' 2002.
"A Guide to The SQL Standard", Fourth Edition, C.J. Date with Hugh Darwen, *An Overview of SQL*, Part I, pp. 9-26.

* cited by examiner

*Primary Examiner*—Etienne P LeRoux
(74) *Attorney, Agent, or Firm*—Mattingly, Stanger, Malur & Brundidge, P.C.

(57) ABSTRACT

A stream data processing system capable of highly reliable and highly usable real time data processing, is provided with: (1) a mechanism of copying some or all of stream data, and archiving the stream data in a non-volatile memory to allow real time data and archive data to be used seamlessly; and (2) a mechanism of improving the performance of query processings by using a plurality of stream data processing systems cooperatively.

15 Claims, 14 Drawing Sheets

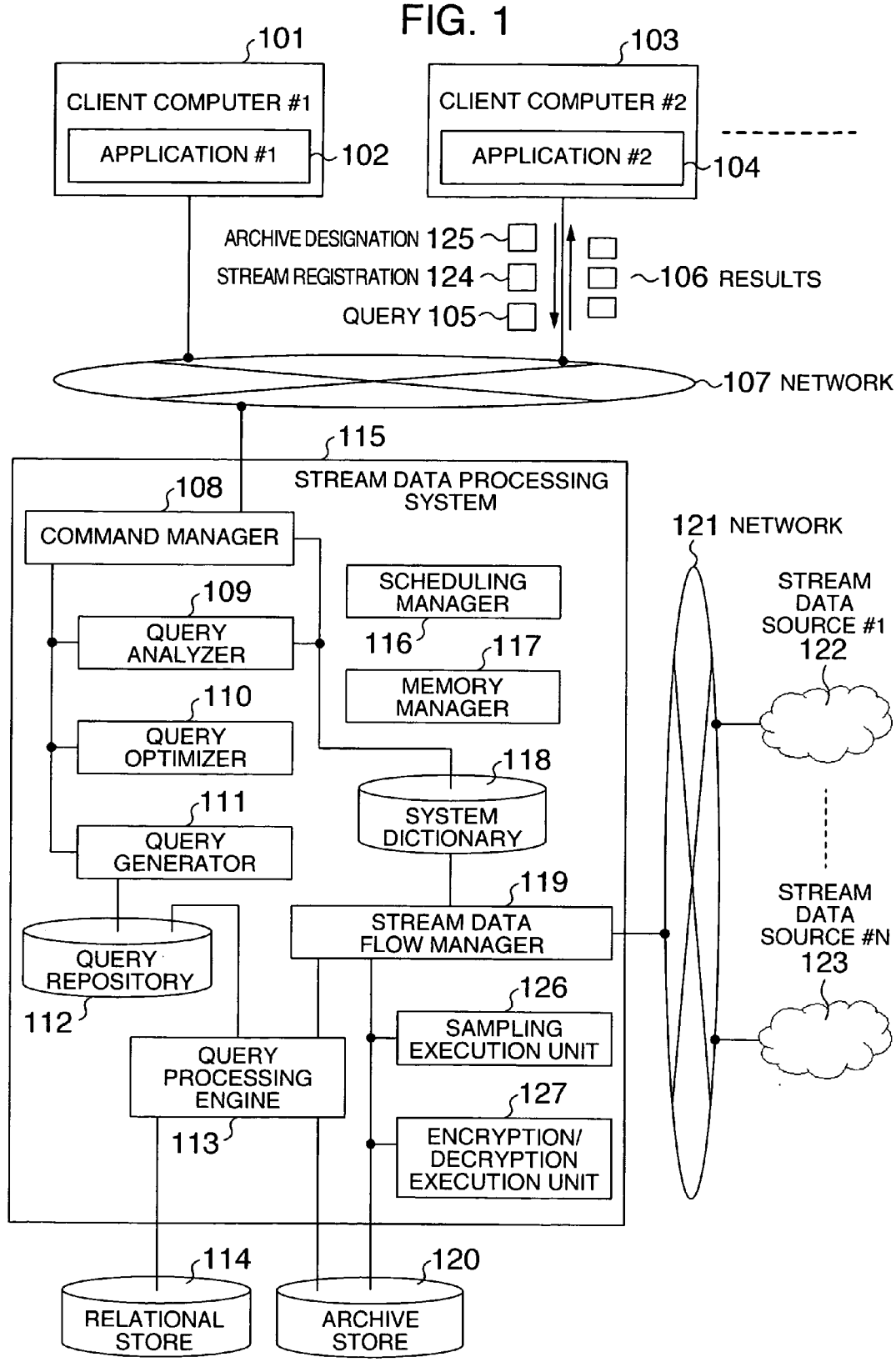

FIG. 2

REGISTER QUERY

```
register query Q1 as
    select parts.id, parts. manufacturer, parts.lotno
    from parts [range 2 hours], defect_list [range 2 weeks]
    where parts.id = defect_list.id
    start at 2004/09/08 09:00:00 JST
    end at 2004/09/10 17:00:00 JST;
```
~201

DELETE QUERY

```
drop query Q1;
```
~202

FIG. 4

REGISTER STREAM

```
register stream
    parts (id integer, manufacturer char (32),
          lotno integer, gendate date)
    from nishizawa_parts.com
    protocol SOAP/HTTP
    at port:8080
    start at 2004/09/08 09:00:00 JST
    end at 2004/09/10 17:00:00 JST;
```
~401

```
register stream
    defect_list (id integer, parts_id integer,
              defect_type char (16), report_ date date)
    from nishizawa_parts.com
    protocol SOAP/HTTP
    at port:8081
    start at 2004/08/01 09:00:00 JST
    end at 2004/12/31 17:00:00 JST;
```
~402

DELETE STREAM

```
drop stream parts;
```
~403

```
drop stream defect_list;
```
~404

FIG. 3

QUERY MANAGEMENT TABLE

| QUERY NAME (301) | QUERY (302) | QUERY EXECUTION FORMAT STORAGE DESTINATION (303) | REGISTRANT (304) |
|---|---|---|---|
| Q1 | select parts.id, parts. manufacturer, parts.lotno from parts [range 2 hours], defect_list [range 2 weeks] where parts.id = defect_list.id; | 0x7FFFAEE1 | itaru |
| ---- | ---- | ---- | ---- |

| REGISTRATION DATE/TIME (305) | EXECUTION START TIME (306) | EXECUTION END TIME (307) | EXECUTION TARGET STREAM (308) |
|---|---|---|---|
| 2004/09/07 13:07:26 JST | 2004/09/08 09:00:00 JST | 2004/09/10 17:00:00 JST | parts, defect_list |
| ---- | ---- | ---- | ---- |

FIG. 5

STREAM MANAGEMENT TABLE

| STREAM NAME (501) | STREAM DEFINITION (502) | STREAM DATA SOURCE (503) |
|---|---|---|
| parts | id integer, manufacturer char (32), lotno integer, gendate date | nishizawa_parts.com |
| defect_list | id integer, parts_id integer, defect_type char (16), report_date date | nishizawa_parts.com |
| ----- | ----- | ----- |

| PROTOCOL (504) | PORT (505) | STREAM RECEPTION START TIME (506) | STREAM RECEPTION END TIME (507) | REGISTRANT (508) | REGISTRATION DATE/TIME (509) |
|---|---|---|---|---|---|
| SOAP/HTTP | 8080 | 2004/09/08 09:00:00 JST | 2004/09/10 17:00:00 JST | itaru | 2004/09/07 13:10:32 JST |
| SOAP/HTTP | 8081 | 2004/08/01 09:00:00 JST | 2004/12/31 17:00:00 JST | itaru | 2004/07/25 13:25:32 JST |
| ----- | ----- | ----- | ----- | ----- | ----- |

FIG. 6

ARCHIVE DESIGNATION

```
archive stream parts on id, manufacturer, lotno, gendate
    as parts_archived to RAID_01
    start at 2004/09/08 09:00:00 JST
    end at 2004/09/10 17:00:00 JST
    sampling enable on id
    sampling method = random, rate = 10%
    encryption disabled;
```
~601

```
archive stream defect_list on id integer, parts_id integer,
        defect_type char (16), report_date date
    as defect_list_archived to RAID_00
    start at 2004/08/01 09:00:00 JST
    end at 2004/12/31 17:00:00 JST
    sampling disabled
    encryption enabled
    encryption method = DES;
```
~602

FIG. 8

```
select Employee.id, Employee. name
from Employee
where Employee.salary >= 300,000;
```

FIG. 7

ARCHIVE MANAGEMENT TABLE

| ARCHIVE OBJECT STREAM (701) | ARCHIVE OBJECT ATTRIBUTE (702) | ARCHIVE NAME (703) | ARCHIVE START TIME (704) | ARCHIVE END TIME (705) |
|---|---|---|---|---|
| parts | id, manufacturer, lotno, gendate | parts_archived | 2004/09/08 09:00:00 JST | 2004/09/10 17:00:00 JST |
| defect_list | id, parts_id, defect_type, report_date | defect_list_archived | 2004/08/01 09:00:00 JST | 2004/12/31 17:00:00 JST |
| ----- | ----- | ----- | ----- | ----- |

| ARCHIVE DESTINATION STORAGE (706) | SAMPLING (707) | SAMPLING OBJECT ATTRIBUTE (708) | SAMPLING METHOD (709) | SAMPLING RATE (710) |
|---|---|---|---|---|
| RAID_01 | enabled | id | random | 10% |
| RAID_00 | disabled | NULL | NULL | NULL |
| ----- | ----- | ----- | ----- | ----- |

| ENCRYPTION (711) | ENCRYPTION SCHEME (712) | REGISTRANT (713) | REGISTRATION DATE/TIME (714) |
|---|---|---|---|
| disabled | NULL | itaru | 2004/09/07 13:10:32 JST |
| enabled | DES | itaru | 2004/07/25 13:25:32 JST |
| ----- | ----- | ----- | ----- |

FIG. 11

MEMORY MANAGEMENT TABLE

| ASSIGNEE OBJECT ID 901 | ASSIGNEE TYPE 902 | ASSIGNMENT REQUEST AMOUNT 903 | PRIORITY ORDER 904 | ASSIGNED MEMORY AMOUNT 905 | ASSIGNED PAGE LIST 906 |
|---|---|---|---|---|---|
| 101001 | STREAM PROCESS BUFFER | 10MB | 100 | 10MB | 0x8FFADEF8, |
| 101002 | STREAM PROCESS BUFFER | 50MB | 95 | 30MB | 0x8FFADFA2, |
| ----- | ----- | ----- | ----- | ----- | ----- |

FIG. 12

```
Q1 :
    select parts.id, parts. manufacturer, parts.lotno
    from parts [range 2 hours], defect_list [range 2 weeks]
    where parts.id = defect_list.id;
```
~1001

```
Q1' :
    select parts.id, parts. manufacturer, parts.lotno
    from parts [range 2 hours], defect_list [range 3 hours]
    where parts.id = defect_list.id
    union all
    select parts.id, parts. manufacturer, parts.lotno
    from parts [range 2 hours], defect_list archived
    where parts.id = defect_list_archived.id
        and defect_list_archived.systime < curtime() − 3 hours
        and defect_list_archived.systime >= curtime() − 2 weeks;
```
~1002

FIG. 14

```
Select Count(*)
From Requests S [Range 1 Day Preceding]
Where S.domain = 'stanford.edu'
```

QUERY PROCESSING METHOD FOR STREAM DATA PROCESSING SYSTEMS

INCORPORATION BY REFERENCE

The present application claims priority from Japanese application JP 2005-163440 filed on Jun. 3, 2005, the content of which is hereby incorporated by reference into this application.

BACKGROUND OF THE INVENTION

1. Field of the Invention

The present invention relates to a method of configuring a stream data processing system capable of seamlessly accessing real time stream data and archive data, a method of seamlessly accessing real time data and archive data in the stream data processing system, and a stream data processing method using a plurality of stream data processing systems cooperatively.

2. Description of the Related Art

In a database management system (hereinafter described as DBMS) for processing data stored in a storage, there is a high demand for a data processing system capable of processing data arriving from time to time in real time. For example, in a stock marketing system, how quickly responds to a change in stock prices is one of most important issues. An approach to storing stock data once in a storage and retrieving the stored data as in a conventional DBMS cannot follow the speed of stock price change and may lose a business chance. U.S. Pat. No. 5,495,600 discloses a mechanism of periodically executing stored queries. It is difficult, however, to apply this mechanism to real time data processing an important point of which is to execute a query immediately upon arrival of data such as stock prices.

As a data processing system suitable for such real time data processing, a stream data processing system has been proposed. For example, a stream data processing system STREAM is disclosed in "Query Processing, Resource Management, and Approximation in a Data Stream Management System" written by R. Motwani, J. Widom, A. Arasu, B. Babcock, S. Babu, M. Datar, G. Manku, C. Olston, J. Rosenstein, and R. Varma, in Proc. of the 2003 Conf. on Innovative Data Systems Research (CIDR), January 2003.

As different from a conventional DBMS, the stream data processing system registers a query and continuously executes the query upon arrival of data. In order to efficiently process stream data, STREAM introduces the concept called a sliding window for partially cutting out stream data. A typical example of a descriptive language for a query including designation of the sliding window is Continuous Query Language (CQL) disclosed in the above-described document written by R. Motwani et al. CQL has an extension of designating the sliding window by using square brackets following a stream name in a FROM phrase of Structured Query Language (SQL) widely used by DBMS. The details of SQL are written in "A Guide to SQL Standard (4th Edition)" written by C. J. Date, Hugh Darwen, Addison-Wesley Professional, 4 Edition, ISBN 0201964260. FIG. 14 shows an example of a query of CQL shown in Chapter 2.1 of the above-described document written by R. Motwani, et al. This query calculates the total number of accesses per past day from a domain stanford.edu. "Request" is not a table used by a conventional DBMS but an endless stream. Therefore, the total number cannot be calculated without a sliding window designation [Range 1 Day Preceding]. Stream data which remains in the sliding window is stored in a memory and used for query processing.

The stream data processing system is expected to be adopted to applications requiring real time processing, typically financial applications, traffic information systems, and computer system management. However, a conventional stream data processing system is difficult to be adopted to the real business because it has the following problems: (1) stream data is lost if a system load increases or if the query processing of the stream data processing system is delayed or stopped by system faults; (2) stream data processing cannot be executed if the available memory is insufficient for the size of sliding window designated by the query; (3) a retrieval range cannot be expanded to an earlier time than when the query is registered; and (4) if stream data having a capacity over the ability of the stream data processing system arrives or requires to be processed, the performance necessary for businesses cannot be retained.

In order to provide a stream data processing system capable of being adopted to real businesses, there are the following issues: (1) protecting stream data even if a system load increases or the query processing of the stream data processing system is delayed or stopped by system faults; (2) executing stream data processing even if the available memory is insufficient for the size of a window designated by the query; (3) expanding a retrieval range to an earlier time than when the query is registered; and (4) providing a mechanism for retaining the performance necessary for the real business even if stream data having a capacity over the ability of the stream data processing system arrives or requires to be processed.

SUMMARY OF THE INVENTION

It is a first object of the present invention to provide a mechanism for protecting stream data even if a load increases or the query processing of the stream data processing system is delayed or stopped by system faults.

It is a second object of the present invention to provide a mechanism for executing stream data processing even if the available memory is insufficient for the size of a window designated by the query.

It is a third object of the present invention to provide a mechanism for expanding a retrieval range to an earlier time than when the query is registered.

It is a fourth object of the present invention to provide a mechanism for retaining the performance necessary for the real business even if stream data having a capacity over the ability of the stream data processing system arrives or requires to be processed.

In order to achieve the first object, the present invention provides a mechanism of copying, if necessary, some or all of stream data and archiving the stream data in a non-volatile memory. In order to achieve the second object, the present invention provides a mechanism of rewriting a query unable to be executed because of an insufficient memory capacity, among queries registered in the system by a user or application, into a query able to be executed on the memory and a query to be executed for the archived data, combining the result obtained by executing the rewritten query for the stream data in the memory and the result obtained by executing the rewritten query for the archived data, and returning the combined results to the user or application. In order to achieve the third object, the present invention provides a mechanism of processing a query for stream data not existing in the memory by using the archive data and gradually assigning the memory usable for a newly registered query to continue the query processing. In order to achieve the fourth object, the present invention provides a mechanism of improving the performance of query processings by using a plurality of stream data processing system cooperatively.

According to the present invention, it is possible to realize a stream data processing system capable of highly reliable and highly usable real time data processing.

Other objects, features and advantages of the invention will become apparent from the following description of the embodiments of the invention taken in conjunction with the accompanying drawings.

BRIEF DESCRIPTION OF THE DRAWINGS

FIG. 1 is a block diagram showing the configuration of a stream data processing system and related systems.

FIG. 2 is a conceptual diagram showing a query registration command and a query delete command of the embodiment.

FIG. 3 is a diagram showing the structure of data in a query management table of the embodiment.

FIG. 4 is a conceptual diagram showing a stream definition command of the embodiment.

FIG. 5 is a diagram showing the structure of data in a stream management table of the embodiment.

FIG. 6 is a conceptual diagram showing an archive designation command of the embodiment.

FIG. 7 is a diagram showing the structure of data in an archive management table of the embodiment.

FIG. 8 is a diagram showing an example of a query for a table of the embodiment.

FIG. 11 is a diagram showing the structure of data in a memory management table of the embodiment.

FIG. 12 is a conceptual diagram showing an example of query rewriting of the embodiment.

FIG. 14 shows an example of a query statement in Stanford University's stream processing system prototype stream.

DESCRIPTION OF THE EMBODIMENTS

Figure 9:
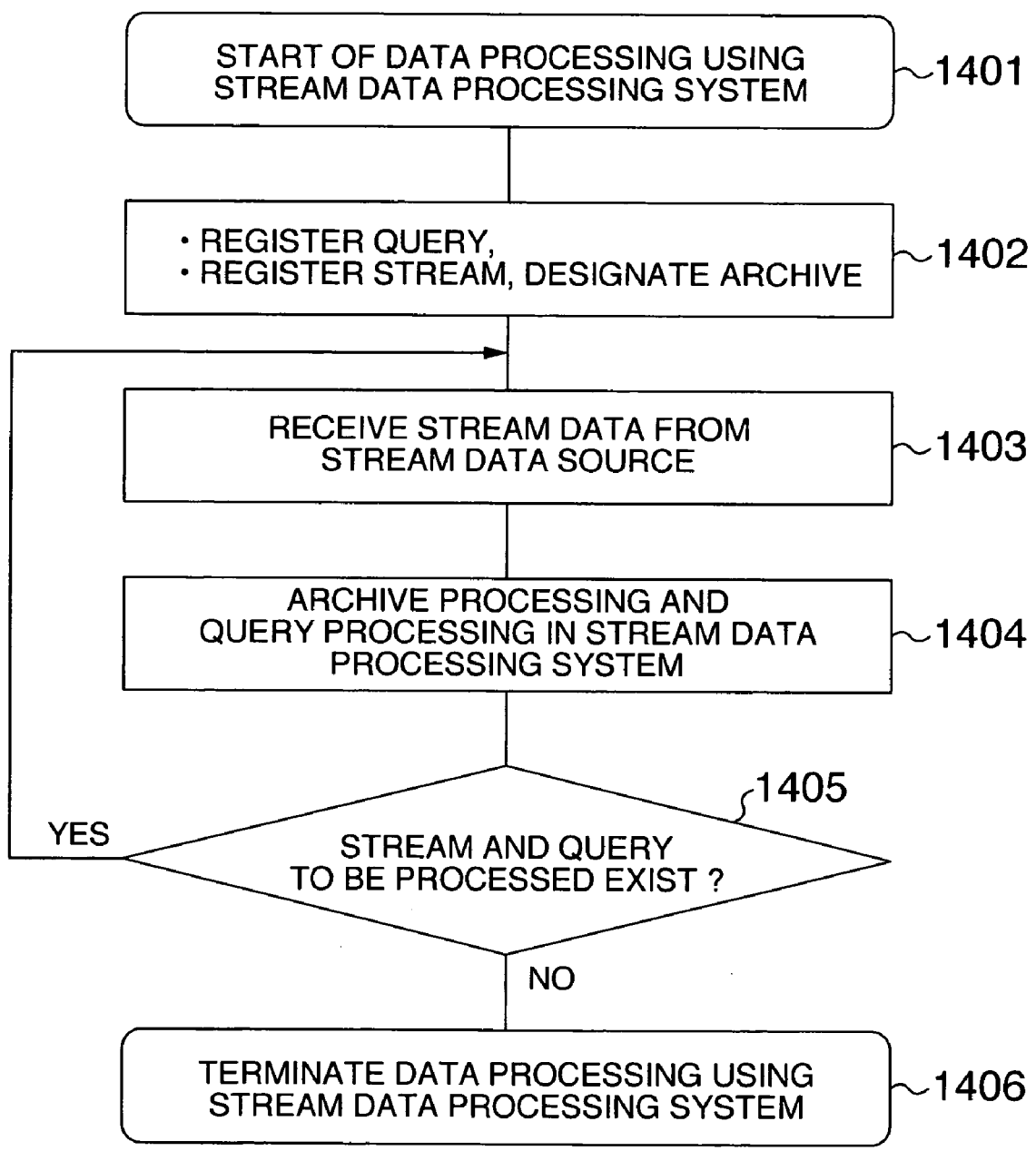
FIG. 9 is a flow chart illustrating a data processing procedure of the embodiment.

FIG. 1 shows a stream data processing system and its related systems according to an embodiment of the present invention. A client computer 101 for executing an application #1 102 and a client computer 103 for executing an application #2 104 are connected via a network 107 to a stream data processing system 115. The network 107 may be a local area network (LAN) interconnected by Ethernet (registered trademark), optical fibers, or FDDI, or a wide area network (WAN) slower than LAN, including the Internet. The client computer may be an arbitrary computer: a personal computer such as Hitach FLORA (registered trademark) manufactured by Hitachi Ltd. or a Hitachi UNIX (registered trademark) work station 9000V B2600 manufactured by Hitach Ltd., etc.

The application first registers a query 105 in the stream data processing system. With reference to FIGS. 1, 2 and 3, description will be made on suitable examples of a query registration procedure, a storage method for data in the stream data processing system, and a storage format. The application #2 104 of the client computer 103 transmits a query Q1 201 to a command manager 108 in the stream data processing system 115 by using a query registration command 201 shown in FIG. 2. The command manager 108 analyzes the received command and sends a query portion (second to fourth rows at 201) in the query registration command 201 to a query analyzer 109. The query analyzed by the query analyzer 109 is then sent to a query optimizer 110. The query optimizer 110 executes an optimizing process of selecting an efficient execution format, and a query generator 111 generates a query execution format in accordance with the results of the optimizing process. A method of generating an execution format from a declarative type query such as the query Q1 201 is disclosed in Chapter 3 of the document written by R. Motwani, et al. The query converted into the execution format is stored in a query repository 112.

Reference numeral 201 in FIG. 2 represents an example of the statement of a command suitable for registering the query Q1 in the stream data processing system. The query Q1 indicates that defect product data (defect_list) of the past two weeks is referred to parts data (parts stream) of past two hours in a work process, and parts IDs (parts.id), parts manufacturers (parts. manufacturer) and parts lot numbers (parts. lotno) are extracted (second to fourth rows at 201), and that the execution start time is 2004/09/08 09:00:00 JST (fifth row at 201) and the execution end time is 2004/09/10 17:00:00 JST (sixth row at 201).

The query Q1 is stored in a query management table in the query repository 112 shown in FIG. 1. The structure of the query management table is shown in FIG. 3. The name of the registered query is loaded in a "query name" column 301. The query including the sliding window designation is loaded in a "query" column 302. An address (pointer) of a storage destination of the query execution format generated by the query analyzer 109, query optimizer 110 and query generator 111 is loaded in a "query execution format storage destination" column 303. By forming in advance the execution format, it is possible to reduce an overhead of compiling to be performed each time the query is executed. A query registrant and a query registration date/time are loaded in a "registrant" column 304 and a "registration date/time" column 305, respectively, and are used for system access management and system security management. An execution start and an execution end time of the registered query are loaded in an "execution start time" column 306 and an "execution end time" column 307, respectively. By using these information, the system can efficiently distribute computer resources to a plurality of queries.

A stream name for which the query is executed is loaded in an "execution object stream" column 308. Reference numeral 202 in FIG. 2 represents an example of a command for deleting the registered query from the system. When this command is executed, the entry of the query Q1 is deleted from the query management table.

Next, with reference to FIGS. 1, 4 and 5, description will be made on a method of registering a stream in the stream data processing system and a method of storing data in the system of the embodiment. The application #2 104 running on the client computer 103 issues a stream registration command shown in FIG. 4 to the stream data processing system 115 to designate a stream definition. The command manager 108 analyzes the received command, refers to a system dictionary 118 to check schema of the designated stream definition, and registers the stream definition in a stream management table shown in FIG. 5. The stream management table is stored in the system dictionary 118.

A stream registering method will be described specifically by referring to the stream registration command 401 of the parts stream among the stream registration commands illustratively shown in FIG. 4 and the corresponding entry of the stream management table shown in FIG. 5. The "parts" stream is constituted of an "id" attribute of an integer type, a "manufacturer" attribute of char (32) type, a "lotno" attribute of an integer type, and a "gendate" attribute of a date type (two and third rows at 401). A stream name and attribute information constituting the stream are loaded in a "stream name" column 501 and a "stream definition" column 502 of the stream management table, respectively. The fourth row of the stream definition command 401 indicates that a transmission source of the parts stream is nishizawa_parts.com, the fifth row indicates that a transmission protocol is SOAP/HTTP, the sixth row indicates that 8080 is used as a communication port, the seventh row indicates that a reception start time of the parts stream is 2004/09/08 09:00:00 JST, and the eighth row indicates that a reception end time of the parts stream is 2004/09/10 17:00:00 JST. These information is loaded in a "stream name" column 501 of the stream management table, a "stream definition" column 502, a "stream data source" column 503, a "protocol" column 504, a "port" column 505, a "stream reception start time" column 506 and a "stream reception end time" column 507, respectively. A stream registrant and a registration date/time are loaded in a "registrant" column 508 and a "registration date/time" column 509 of the stream management table, respectively.

Next, with reference to FIGS. 1, 6 and 7, description will be made on an archive mechanism of the stream data processing system of the embodiment. The application #2 104 of the client computer 103 issues a archive stream command shown in FIG. 6 to the stream data processing system 115 to issue an archive request 125. The command manager 108 analyzes the received command and registers it in an archive management table shown in FIG. 7. Similar to the stream management table, the archive management table is stored in the system dictionary 118.

The details of the archive stream command shown in FIG. 6 and a method of registering the command in the system will be described specifically by referring to the archive definition command (archive designation) 601 of the parts stream shown in FIG. 6 and the corresponding entry of the archive management table shown in FIG. 7. The first row of the archive designation indicates that archive is executed for the attributes of id, manufacturer, lotno, and gendate constituting the parts stream. Attributes contained in the archive are loaded in an "archive object attribute" column 702 of the archive management table shown in FIG. 7. The second row of the archive designation 601 indicates that an archive name is parts-archived and a storage destination of archive data is RAID_01. These information is loaded in an "archive name" column 703 and an "archive destination storage" column 706 of the archive management table, respectively. The third and fourth rows of the archive designation 601 indicate a start time and an end time of the archive, and these information is loaded in an "archive start time" column 704 and an "archive end time" column 705, respectively. The fifth row of the archive designation 601 indicates that the attribute id is sampled when the archive is executed, and the sixth row indicates that a sampling method is random sampling and a sampling rate is 10%. Enabled/disabled sampling, sampling object attributes, a sampling method and a sampling rate are loaded in a "sampling" column 707, a "sampling object attribute" column 708, a "sampling method" column 709 and a "sampling rate" column 710 of the archive management table, respectively. The amount of stream data becomes enormous depending upon its arrival rate and if all the data is not necessary to be stored, this sampling designation is very important.

If all data is required to be archived, as indicated by the sixth row of the archive designation 602, sampling disabled is designated. When the stream designated with sampling is received, a sampling execution unit 126 executes sampling when the stream data is archived, in accordance with an instruction from a stream data flow manager 119 in the stream data processing system 115 shown in FIG. 1.

The seventh row of the archive designation 601 indicates whether encryption is made when the archive is generated. It is said that encryption during data storage is important in terms of high security requirements. This attribute is loaded in an "encryption" column 711 of the archive management table. Since the parts stream of the archive definition 601 is not encrypted, the encryption attribute is designated as disabled. However, the defect_list stream of an archive definition 602 is encrypted and DES is designated as an encryption scheme. An encryption scheme is loaded in an "encryption scheme" column 712 of the archive management table.

When the stream designated with encryption is received, an encryption/decryption execution unit 127 encrypts the stream data when it is archived, in accordance with an instruction from the stream data flow manager 119 in the stream data processing system 115 shown in FIG. 1. When data is read from the archive, the encryption/decryption execution unit 127 decrypts the data. A registrant and a registration date/time of archive designation are loaded in a "registrant" column 713 and a "registration time" column 714 of the archive management table, respectively, and are used for system access log management and system security management.

Reverting to FIG. 1, description will be made on other main constituent elements of the stream data processing system. A relational store 114 stores tables to be used by a conventional DBMS. The stream data processing system 115 can use tables of the conventional DBMS in addition to the stream data, as the retrieval object. If a table is used as a retrieval object, as shown in FIG. 8, a retrieval object table is designated in the FROM phrase of a query. A query shown in FIG. 8 retrieves IDs (id) and names (name) of employees having a salary (salary) of 300 thousands YEN or more from an employee table Employee. A scheduling manager 116 performs scheduling of the system for stream query processings. A memory manager 117 assigns a memory to a query processing engine 113 or another manager, if necessary, during system operation, and when it becomes unnecessary, a garbage collection process is executed. The main constituent elements of the stream data processing system 115 have been described.

With reference to FIGS. 1 and 9, the data processing procedure using the stream data processing system 115 will be described. In the data processing using the stream data processing system 115, first, the application or a user registers a query and stream in the system (1402). Although the application program is executed on the client computer connected via the network in FIG. 1, the application program can be executed on the computer on which the stream data processing system 115 runs. The order of registering the query and stream may be reversed. After the stream is registered, an archive designation for the stream is conducted if necessary (1402).

After the query and stream are registered in the system and the archive designation is conducted, it starts to receive stream data from stream data sources 122 and 123 in FIG. 1 via a network 121 (1403). Upon reception of the stream data, the stream data flow manager 119 refers to the stream management table (FIG. 5) and archive management table (FIG. 7) in the system dictionary 118, copies the stream if necessary, and distributes the stream to the archive store 120 and query processing engine 113. Then, the archive store 120 and query processing engine 113 execute archive processing and query processing, respectively (1404). The details of the query processing will be later described. It is necessary to continuously execute the archive processing and query processing, while the stream data arrives at the system and during the period from the start time and end time of each processing designated at the query registration, stream registration and archive registration step (1402). The stream data processing system refers to the stream management table shown in FIG. 5 and the archive management table shown in FIG. 7 to check the start time and end time of each processing designated at the query registration, stream registration and archive registration step, and if it is judged that it is necessary to execute at least one processing (if Yes at Step 1405), the processing continues. If it is judged that it is not necessary to continue each processing (No at Step 1405), then the data processing is terminated (1406).

Next, with reference to FIG. 10, description will be made on a query processing method in the stream data processing system. It is assumed that the definition of the query is Q1 201 shown in FIG. 2 and that the parts stream and defect_list stream stated in the query are defined by the stream registration commands 401 and 402 shown in FIG. 4, respectively. It is also assumed that archive designations for the stream data sets are represented by 601 and 602 shown in FIG. 6. It is assumed that the current time is 2004/09/09 10:10:20 JST. The stream data flow manager 119 checks the stream management table (FIG. 5) and archive management table (FIG. 7) in the system dictionary. Since both the parts stream 801 and defect_list stream 802 are within the stream reception time period and archive forming period, data is received from the two streams and copied, one data being stored in the archive store 120 and the other data being sent to the query processing engine 113. The query processing engine 113 refers to the query management table (FIG. 2) in the query repository 112 shown in FIG. 1 to check that it is a time within an execution time period of the query Q1 (FIG. 3), and continues the execution of the query process.

The query Q1 is a join process for the parts stream and defect_list stream. As show in the query processing engine 113, a method suitable for executing the join process is to join the two input streams at a join operator 807 and output results 810 as a stream. However, as different from a conventional table, if the stream data is discarded once, it cannot be read again fundamentally. It is therefore necessary to use buffers for temporarily storing the stream data. To this end, the query processing engine 113 is assigned a process buffer 808 for the parts stream and a process buffer 809 for the detect_list stream. The join process of streams using the buffers is disclosed in "Maximizing the Output Rate of Multi-Way Join Queries over Streaming Information Sources" written by Stratis Viglas, Jeffrey F. Naughton, and Josef Burger, in Proc. of VLDB 2003, pp. 285-296).

Buffer assignment for stream processing is performed by the memory manager 117 shown in FIG. 1 in the stream data processing system. A preferred embodiment of a memory management table is shown in FIG. 11 which is suitable for managing a memory assignment state of the whole system. An "assignee object ID" for uniquely identifying a memory assignee object is loaded in a column 901 of the memory management table, an "assignee type" representative of a type of the object is loaded in a column 902, an "assignment request amount" representative of a memory amount requested by the object is loaded in a column 903, a "priority order" representative of a priority order of memory assignment is loaded in a column 904, an "assigned memory amount" representative of a memory amount really assigned to the object is loaded in a column 905, and an "assigned page list" which is a list of pages of an assigned memory is loaded in a column 906.

In the example shown in FIG. 11, an entry (first entry in the memory management table) having an object ID of 101001 is assigned to a parts process buffer, and an entry (second entry in the memory management table) having an object ID of 101002 is assigned to a defect_list buffer. A memory of 10 MB is assigned to the parts stream as requested in accordance with the assignment request amount of 10 MB, whereas a memory of 30 MB is assigned to the defect_list stream, relative to the assignment request amount of 50 MB. In such a case, a conventional stream data processing system cannot hold the stream data necessary for each processing and it is very difficult to continue the query processing. The stream data processing system of the present embodiment is provided with a mechanism of continuing the processing if archive data in the archive store 120 can be utilized, even if the requested memory assignment to the buffer is impossible. More specifically, the archive object attribute 702 shown in FIG. 7 of the defect_list stream for which the memory assignment is insufficient, contains the defect_list.id which is the attribute of the defect-list necessary for the query processing. Therefore, the query Q1 to be processed is rewritten into a query using as its object the buffers in the query processing engine and a query using as its object the defect_list_archived which is an archive of the defect_list stream in the archive store 120. The processing results are combined to allow the query processing to continue.

FIG. 12 shows an example of a preferred rewritten query. Q1 1001 is an original query, and Q1' 1002 is a rewritten query. In this embodiment, of the process buffer for two weeks requested by the defect_list, the buffer for three hours capable of being mapped on a memory is used and the remaining data is read from the archive. In this embodiment, a systime attribute in the defect_list_archived represents a time stamp when the archive is executed, and a curtime( ) function is a function of acquiring the time when the query processing is executed.

In this embodiment, a judgment whether the query can be processed by using the archive, described above, is very simple. A general judgment is also possible by using, for example, a method called Query Equivalence, Query Containment written in Chapter 14 "Optimization for Conjunctive Queries" in "Principles of Database and Knowledge-base Systems" written by Jeffrey D. Ullman, Volume II, Computer Science Press, ISBN 0-7167-8162-X.

As described above, since the query processing method for seamlessly executing both real time data processing and archive data processing is used, a conventional stream data processing system which can obtain only the results of the query processing at a present time can be expanded to a system which can execute the query processing by designating a window having a desired size at a desired time, if archive data can be used.

Figure 13:
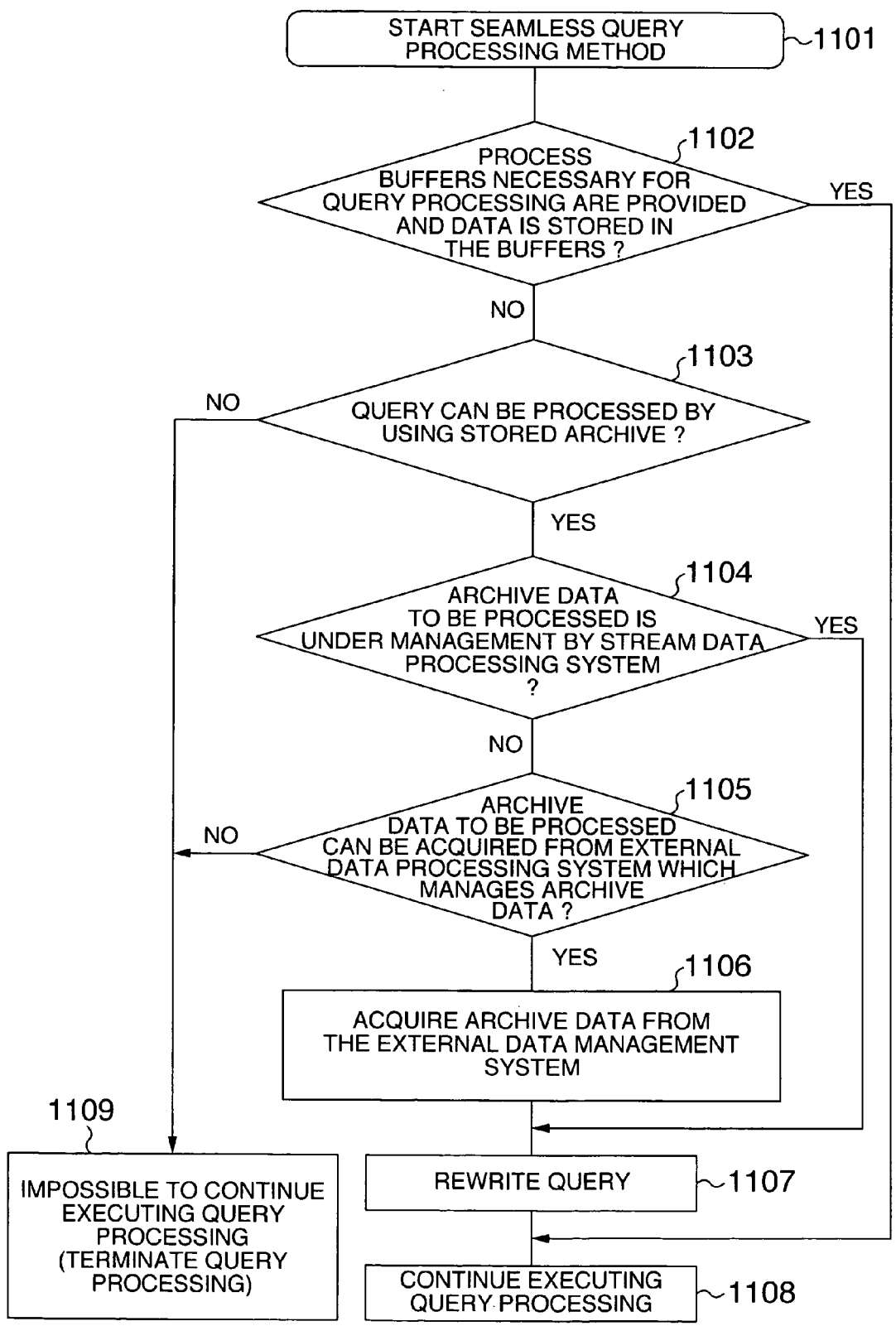
FIG. 13 is a flow chart illustrating a query processing procedure of the embodiment.

FIG. 13 is a flow chart illustrating the procedure of a query processing method (hereinafter called a seamless query processing method) characteristic to the embodiment, by which method both a real time data processing and archive data processing are seamlessly executed. It is first judged whether the buffers necessary for a query to be processed are provided and whether the data necessary for processing is stored in the buffers (Step 1102). If these conditions are satisfied (Yes at Step 1102), it is possible to perform query processing using the buffers so that the query processing continues to be executed at Step 1108. If the conditions are not satisfied (No at Step 1102), the data necessary for continuing query processing does not exist in the buffers so that it is judged whether the data necessary for continuing query processing exists in the archive (Step 1103). If the necessary data does not exist in the archive (No at Step 1103), the query processing is impossible to be continued so that the query processing is terminated (Step 1109). If the data necessary for the query processing exists in the archive (Yes at Step 1103), it is checked whether the archive data is under management by the stream data processing system (Step 1104).

If under management (Yes at Step 1104), the query is rewritten in the manner described with reference to FIG. 12 (Step 1107) to continue executing the query processing (Step 1108). If the archive data is not under management by the stream data processing system (No at Step 1104), it is checked whether the data necessary for the query processing can be acquired from an external data management system which manages the data (Step 1105). If the data cannot be acquired (No at Step 1105), the query processing is impossible to continue so that the query processing is terminated (Step 1109). If the data can be acquired (Yes at Step 1105), the data necessary for the query processing is acquired from the external data management system (Step 1106), and the query is rewritten (Step 1107) to continue executing the query processing (Step 1108). The external data management system for managing the archive may be a DBMS such as a scalable database system HiRDB which is a registered trademark of Hitachi Ltd. In this case, an SQL query is issued to DBMS, and after the acquired data is stored in the archive store, the original query is rewritten to refer to the archive store and continue executing the query processing.

Figure 15:
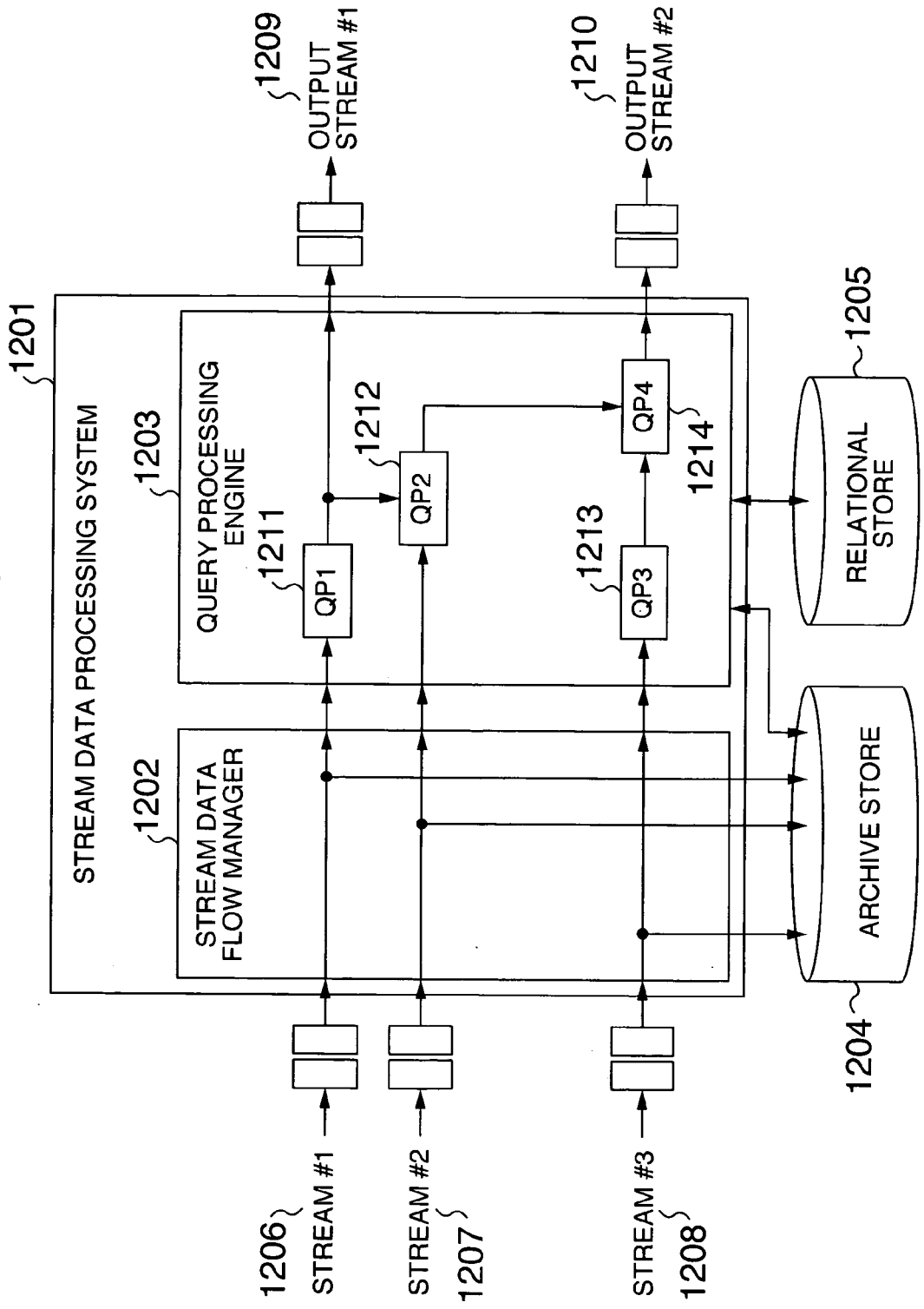
FIG. 15 is a block diagram illustrating query processing by a single stream data processing system according to another embodiment of the present invention.
Figure 16:
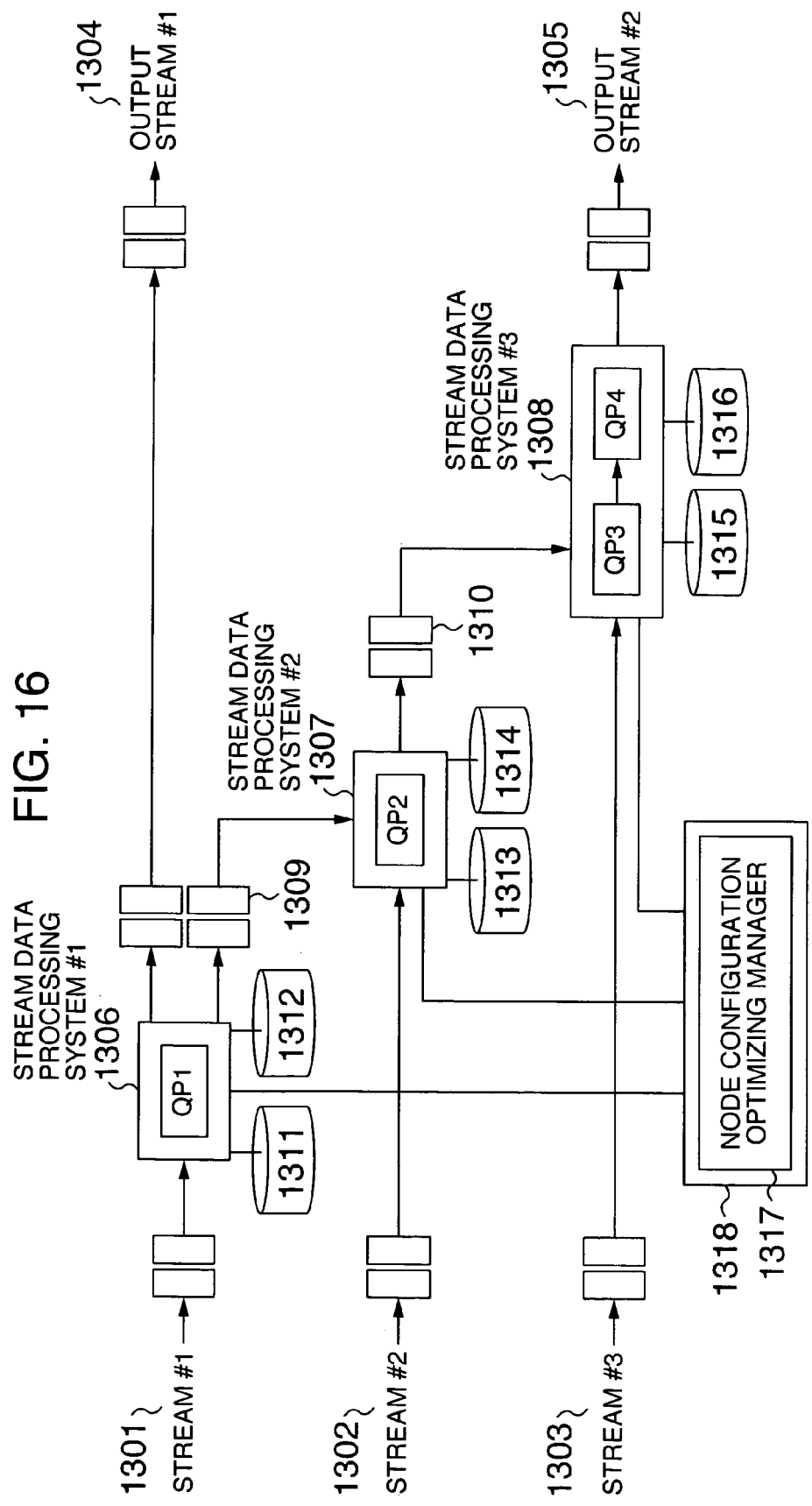
FIG. 16 is a block diagram illustrating distributive stream data processing after node configuration optimization of the embodiment.
Figure 17:
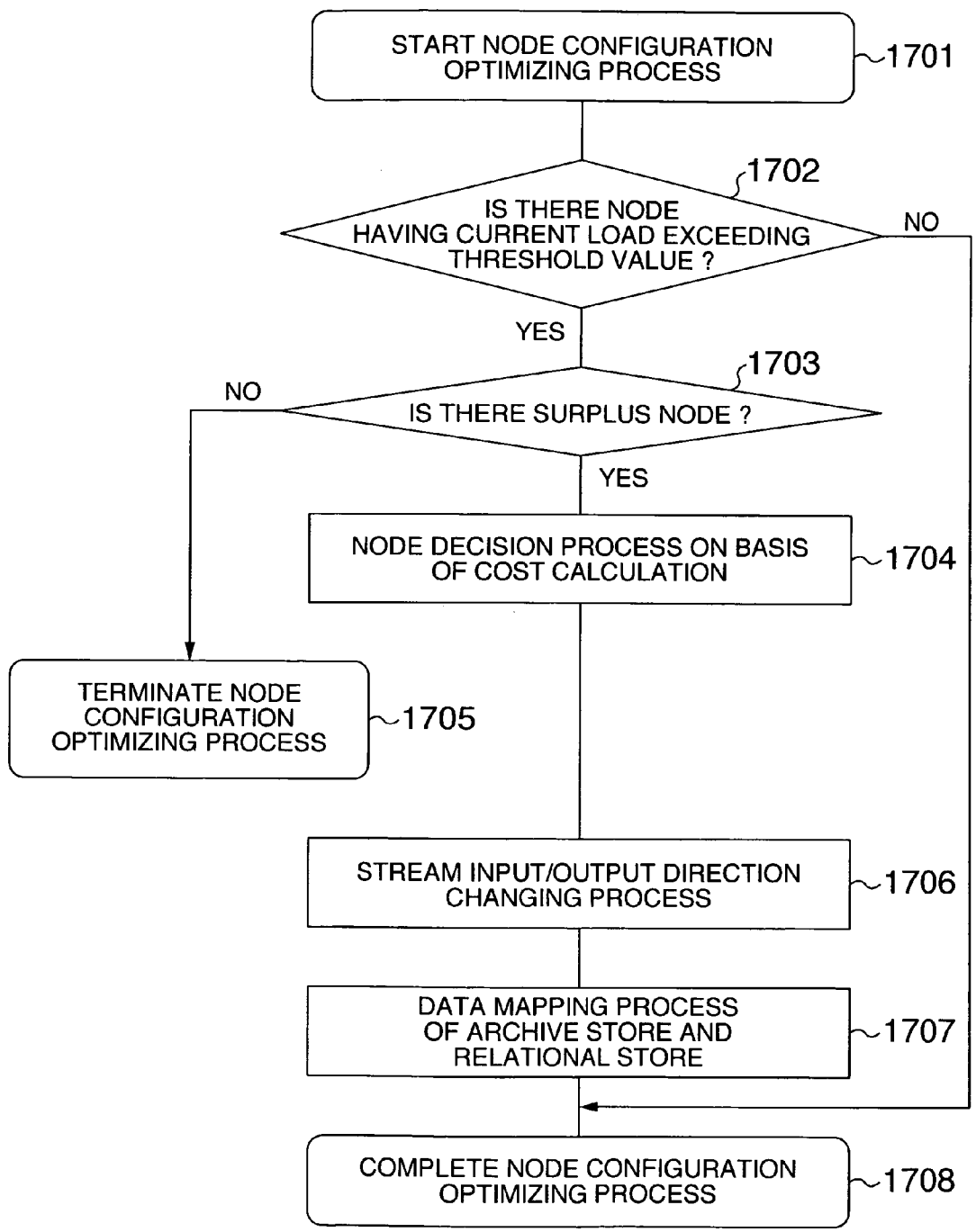
FIG. 17 is a flow chart illustrating a node configuration optimizing procedure of the embodiment.

In this embodiment, the operation of a single stream data processing system has been described mainly. If the number of streams to be processed and an arrival rate of stream data increase, a limit of a processing ability of the single system occurs necessarily. It is effective to operate a plurality of stream data processing systems cooperatively if the necessary processing amount exceeds the ability of the single stream data processing system because of an increase in the number of streams to be processed, an increase in a stream data arrival rate, an increase in a complexity degree of stream data processing and the like. FIGS. 15, 16 and 17 illustrate another embodiment (second embodiment) of the present invention in which the configuration is changed to a configuration of a plurality of stream data processing systems operating cooperatively.

FIG. 15 illustrates that a single stream data processing system 1201 performs predetermined stream data processings according to the second embodiment. Three streams: a stream #1 1206, a stream #2 1207 and a stream #3 1208, are input to the stream data processing system 1201. Similar to the first embodiment, a stream data flow manager 1202 receives the streams, and if necessary, stores them in an archive store 1204. At the same time, the streams are distributed to a query processing engine 1203 to perform query processings. In this embodiment, four query processings are executed including QP1 1211, QP2 1212, QP3 1213 and QP4 1214.

Figure 10:
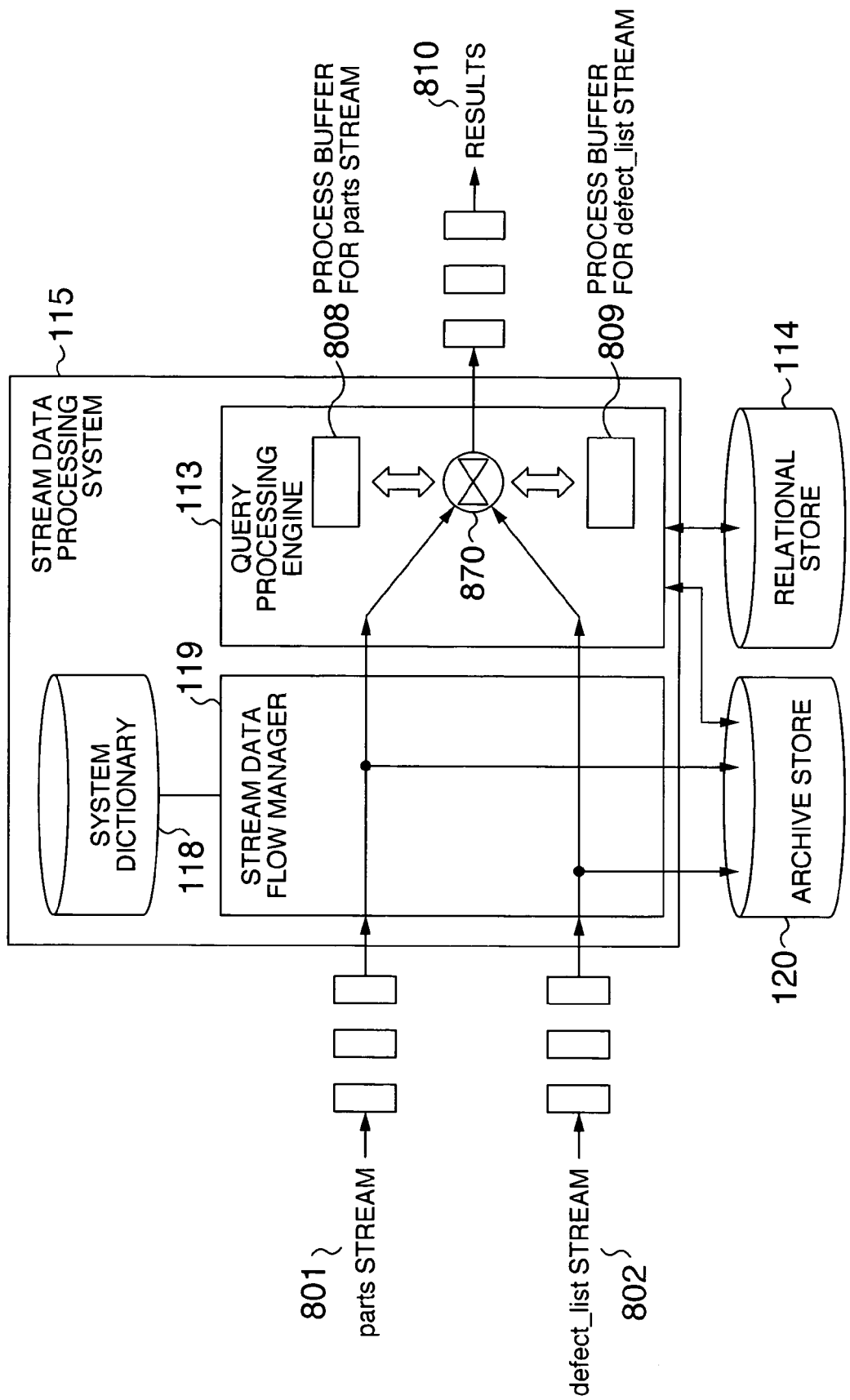
FIG. 10 is a block diagram showing a query processing mechanism of the embodiment.

Each QP may be a query operator which is a query constituent element such as the join operator 807 shown in FIG. 10 or may be a single terminating query (e.g., a query written by CQL). In this embodiment, after the query processings, the stream data processing system 1201 outputs two streams: an output stream #1 1209 and an output stream #2 1210.

This embodiment is characterized by a node configuration optimizing manager 1317 (FIG. 16) which monitors a process node at which the stream data processing system 1201 executing such stream data processings runs, as to whether there is a possibility that arriving stream data cannot be processed because of a high process load, and if necessary, changes the configuration to a configuration that a plurality of process nodes each running each stream data processing system execute the stream data processings cooperatively. FIG. 15 shows only one process node among a plurality of process nodes under management/control by the node configuration optimizing manager 1317, and other process nodes are omitted in FIG. 15. The node configuration optimizing manager 1317 may run on a dedicated computer system 1318 or on one of these process node computers.

FIG. 17 is a flow chart illustrating a node configuration optimizing process to be executed by the node configuration optimizing manager 1317. It is first checked whether there is any node having a current load exceeding a predetermined threshold value (1702). Suitable examples for the threshold value may be a CPU load which can be acquired by a sar command of the operating system or the like, a system load which can be acquired by a system monitoring application, or the like. If there is no node having a load exceeding the threshold value (No at 1702), the node configuration optimizing process is terminated without re-configuration (1708). If there is any node having a current load exceeding the threshold value (Yes at 1702), it is checked whether there is any surplus node which can additionally execute the stream data processings (1703). A suitable embodiment for a method of judging whether a node is a surplus node or not may be a method of checking whether a load of a node is smaller than the threshold value and determining as the surplus node the node having a load smaller than the threshold value.

If there is no surplus node (No at 1703), the query processing cannot be passed to other nodes, and the node configuration optimizing process is terminated (1705). If there is a surplus node (Yes at 1703), a node decision process on the basis of cost calculation (1704) (hereinafter simply called a node decision process) is executed in order to make a plurality of nodes including the surplus node execute query processings. The node decision process will be later described. Upon completion of the node decision process, assignment of nodes to the query processings is already decided. For example, FIG. 16 shows a configuration that the stream data processings made by the single stream data processing system 1201 shown in FIG. 15 are performed cooperatively by three stream data processing systems: a stream data processing system #1 1306, a stream data processing system #2 1307 and a stream data processing system #3 1308. The query processing QP1 is assigned to the stream data processing system #1, the query processing QP2 is assigned to the stream data processing system #2, and the query processings QP3 and QP4 are assigned to the stream data processing system #3. Next, a stream processing input/output direction changing process (1706) is executed after the change in processing assignments to nodes.

In this process, routes of stream communications are set in such a manner that the order of query processings to be executed by a plurality of stream data processing systems after the node decision process is made coincident with the order of processings at the single query processing engine, and if necessary, a copy process of streams is executed. A preferred embodiment will be described with reference to FIGS. 15 and 16. In the query processings QP1 to QP4 in the query processing engine 1203 shown in FIG. 15, an output of QP1 1211 is used as an output stream #1 1209 of the system and an input to QP2 1212. Outputs of QP2 1212 and QP3 1213 are input to QP4 1214, and an output of QP4 1214 is an output stream #2 1210 of the system. In the query processings shown in FIG. 16, the stream data processing system #1 1306 sets the communication route so that an output of the query processing QP1 executed in the system is output as an output stream #1 1304 of the whole system and that a copied stream 1309 is output to the stream data system #2 1307 as an input to the query processing QP2 to be executed in the stream data processing system #2. Similarly, the stream data processing system #2 sets the communication route so that an output stream 1310 of the query processing QP2 executed in the system is output to the stream data processing system #3 1308. The stream data processing system #3 sets the communication route so that the processing results are output as an output stream #2 1305 of the whole system.

After the stream input/output direction changing process (1706), a data mapping process (1707) is executed for the archive store and relational store. This data mapping process is a process of transferring data in the archive store and relational store necessary for each query processing to each stream data processing system to execute it. In the example shown in FIG. 16, archive data and relational data (table) necessary for the query processing QP1 is transferred to an archive store 1311 and a relational store 1312 under management by the stream data processing system #1 1306, respectively. Similarly, archive data and relational data necessary for the query processing QP2 is transferred to an archive store 1313 and a relational store 1314, and archive data and relational data necessary for the query processings QP3 and QP4 is transferred to an archive store 1315 and a relational store 1316.

After the data mapping process (1707), the node configuration optimizing process (1708) is completed. The node configuration optimizing manager 1317, which is a software module for executing the node configuration optimizing process, may run on the dedicated computer system 1318 connected to the process node computer via a network or on a computer at any one of process nodes.

Lastly, description will be made on the node decision process on the basis of cost calculation (1704) (hereinafter simply called a node decision process). In the node decision process, a usable computer node, an input stream and a necessary query processing are input to assign each query processing to each computer node. A preferred embodiment of an assignment method will be described. First, the order of query processings is decided by considering processing dependency. In the example shown in FIG. 15, since the query processing QP2 depends on QP1, the order is set as QP1→QP2. Since QP4 depends on QP3 and QP2, the order is set as QP3→QP4 and QP2→QP4. Therefore, the whole orders are set as two orders: QP1→QP2→QP4 and QP3→QP4. At the next step, the ordered query processings are assigned to the nodes by calculating the processing cost. In this case, it is preferable to calculate a query processing cost for the stream data processing on the basis of an input rate of streams.

A method of calculating a cost on the basis of an input rate of stream data is disclosed in "Rate-based query optimization for streaming information sources" written by Stratis Viglas, Jeffrey F. Naughton, in Proc. of SIGMOD Conference 2002, pp. 37-48. By using this calculation method, a processing cost of the query processing assigned to some node can be calculated. If the query processings required to be processed in order, such as QP1 and QP2, are assigned to different nodes, a communication cost between nodes assigned with QP1 and QP2 is added to the processing cost at each node. Combinations of query processings assigned to each node are set and a total sum of query processing costs and communication processing costs is calculated to select a method of assigning query processings to each node, having a smallest total sum. If it is difficult to calculate costs by considering all combinations, because of a large number of process nodes, a large number of query processings and the like, then a simplified algorithm may be utilized. For example, each query processing is assigned to a different node, and if a total processing cost becomes smaller if consecutive two process nodes are assigned to the same node to the extent that cost calculation is possible, then the two process nodes are coupled together.

According to the present invention, it is possible to realize a stream data processing system capable of highly reliable and highly usable real time data processing.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A query processing method for a stream data processing system in which at least one query for performing data process on the stream data is registered and the registered query is executed to process the data stream received from at least one stream data source, the method comprising:

preparing a first query for a real time data processing which stores the received stream data in a buffer and continuously executes the data process on the data in the buffer and a second query for an archive data processing which acquires archive data and executes the data process on the acquired archive data;

archiving some or all of the received stream data into a non-volatile storage medium as the archive data while executing the first query; and when the stream data cannot be processed by the first query, switching from the first query to the second query to acquire the archive data from the non-volatile storage medium to execute the data process on the acquired archive data.

2. The query processing method for a stream data processing system according to claim 1, wherein when some or all of said received stream data is archived, stream data to be archived is subjected to sampling.

3. The query processing method for a stream data processing system according to claim 1, wherein when some or all of said received stream data is archived, stream data to be archived is subjected to encryption.

4. The query processing method for a stream data processing system according to claim 1, wherein a process of archiving some or all of said received stream data is executed cooperatively with an external data management system.

5. The query processing method according to claim 1, wherein the query is pre-registered with a sliding window specifying a part of the stream data such that a part specified by the sliding window is subjected to the query processing.

6. The query processing method according to claim 1, wherein the query process is read from a program resource via a network and registered.

7. The query processing method according to claim 1, wherein the stream data is acquired from a stream data resource via a network.

8. The query processing method according to claim 1, wherein, when a resource of the stream data processing system is not sufficient to continue to execute the first query, switching to the second query is performed.

9. A query processing method for a stream data processing system in which at least one query for performing data process on the stream data is pre-registered and the pre-registered query is executed to process the data stream received from at least one stream data source, comprising:
   archiving some or all of the received stream data into a non-volatile storage medium as archive data while executing the pre-registered query for a real time data processing which stores the received stream data in a buffer and continuously executes the data process on the data in the buffer;
   rewriting the pre-registered query to the query for an archive data processing which acquires the archive data from the non-volatile storage medium and executes the data process on the acquired archive data; and
   executing the rewritten query to process the archive data.

10. The query processing method according to claim 9, wherein the query is pre-registered with its effective time, and the query is executed during the effective time.

11. The query processing method according to claim 9,
   wherein a stream definition defining a format of the stream data subjected to the query processing and a source of the stream data, and an effective term of the data stream is registered when the query is pre-registered, and
   wherein the stream data within the effective time is used for the query processing.

12. The query processing method according to claim 9, further comprising:
   designating an effective time of archiving operation before the archiving step such that the archiving step is performed during the designated effective time.

13. The query processing method according to claim 9,
   wherein a query is processed cooperatively by two or more stream data processing systems, and
   wherein the method further comprises:
   deciding a process node to be assigned with a query processing in accordance with cost calculation to assign the query processing to the process node in accordance with a decision; and
   if query processings required to be performed in order are assigned to different process nodes, generating an intermediate stream interconnecting said process nodes.

14. The query processing method according to claim 13, wherein in accordance with assignment of the process nodes, archive data necessary for the query processing assigned to each process node is copied or transferred to the process node.

15. The query processing method according to claim 9, further comprising:
   during the pre-registered query execution, determining whether the buffer for the query processing is sufficient and whether the data is in the buffer;
   if the buffer is sufficient and the data is in the buffer, continuing the pre-registered query execution;
   if the buffer is not sufficient or the data is not in the buffer, checking whether the archive data in the non-volatile storage medium includes the data necessary to the query processing;
   if the archive data includes the data necessary to the query processing, executing the rewritten query; and
   combining a result of the pre-registered query execution with a result of the rewritten query execution.

* * * * *